(12) United States Patent
Choi

(10) Patent No.: US 10,924,519 B2
(45) Date of Patent: Feb. 16, 2021

(54) METHOD, APPARATUS, SYSTEM, AND NON-TRANSITORY COMPUTER READABLE MEDIUM FOR INTERWORKING BETWEEN APPLICATIONS OF DEVICES

(71) Applicant: LINE Corporation, Tokyo (JP)

(72) Inventor: Wonjoon Choi, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 363 days.

(21) Appl. No.: 15/481,001

(22) Filed: Apr. 6, 2017

(65) Prior Publication Data
US 2017/0295210 A1    Oct. 12, 2017

(30) Foreign Application Priority Data
Apr. 11, 2016   (KR) .................. 10-2016-0044046

(51) Int. Cl.
*G06F 15/173* (2006.01)
*H04L 29/06* (2006.01)
*H04L 29/08* (2006.01)
*H04L 12/58* (2006.01)
*G06F 15/16* (2006.01)

(52) U.S. Cl.
CPC .......... *H04L 65/1069* (2013.01); *H04L 51/04* (2013.01); *H04L 67/10* (2013.01); *H04L 67/125* (2013.01); *H04L 67/141* (2013.01); *H04L 67/146* (2013.01); *H04L 67/06* (2013.01); *H04L 67/147* (2013.01)

(58) Field of Classification Search
CPC .............................. H04L 51/04; H04L 65/1069
USPC ......................................................... 709/207
See application file for complete search history.

(56) References Cited

U.S. PATENT DOCUMENTS

| 8,613,070 | B1* | 12/2013 | Borzycki | ............ | G06F 21/6218 |
|           |     |         |          |             | 726/8 |
| 2003/0208543 | A1* | 11/2003 | Enete | ................. | H04L 12/1822 |
|           |     |         |       |                  | 709/206 |
| 2005/0114711 | A1* | 5/2005 | Hesselink | .......... | H04L 63/0209 |
|           |     |         |           |            | 726/4 |
| 2013/0194377 | A1* | 8/2013 | Humphries | ............. | H04N 7/15 |
|           |     |         |           |             | 348/14.08 |

(Continued)

FOREIGN PATENT DOCUMENTS

CN        105337926 A      2/2016
KR     2010-0052992 A      5/2010

(Continued)

OTHER PUBLICATIONS

Taiwanese Office Action dated Jul. 11, 2018 in corresponding Taiwanese Application No. 10611176.

(Continued)

*Primary Examiner* — Karen C Tang
(74) *Attorney, Agent, or Firm* — Harness, Dickey & Pierce, P.L.C.

(57) ABSTRACT

Provided is a method and system for interworking between applications of devices. An inter-device application interworking method may provide a function capable of processing an action associated with a single communication session through interworking between applications installed on a plurality of electronic devices, respectively, in response to a presence of the plurality of electronic devices of a user identified in association with a single account of the user.

19 Claims, 15 Drawing Sheets

(56) References Cited

U.S. PATENT DOCUMENTS

| | | | |
|---|---|---|---|
| 2013/0260893 A1 | 10/2013 | Shin et al. | |
| 2013/0262686 A1* | 10/2013 | Hill | H04L 65/1069 |
| | | | 709/228 |
| 2013/0332543 A1 | 12/2013 | Shin et al. | |
| 2014/0019540 A1 | 1/2014 | Shin et al. | |
| 2014/0267577 A1* | 9/2014 | Weber | H04L 12/1822 |
| | | | 348/14.09 |
| 2014/0359018 A1* | 12/2014 | Sun | H04L 65/403 |
| | | | 709/204 |
| 2016/0283456 A1* | 9/2016 | Sitrick | G06F 3/04845 |
| 2016/0315888 A1* | 10/2016 | Uraizee | H04L 51/08 |
| 2017/0163738 A1* | 6/2017 | Tamura | H04M 3/56 |
| 2018/0041553 A1* | 2/2018 | Shiro | H04M 3/56 |
| 2019/0076741 A1* | 3/2019 | Thompson | A63F 13/828 |

FOREIGN PATENT DOCUMENTS

| | | |
|---|---|---|
| KR | 20110000052 A | 1/2011 |
| KR | 2012-0134319 A | 12/2012 |
| KR | 2013-0065751 A | 6/2013 |
| KR | 2013-0104572 A | 9/2013 |
| TW | 2010/42406 A | 12/2010 |
| TW | 2013/10396 A | 3/2013 |
| WO | WO-2015065001 A1 | 5/2015 |

OTHER PUBLICATIONS

International Search Report PCT/ISA/210 for International Application No. PCT/KR2014/010167 dated Jan. 29, 2015.

* cited by examiner

METHOD, APPARATUS, SYSTEM, AND NON-TRANSITORY COMPUTER READABLE MEDIUM FOR INTERWORKING BETWEEN APPLICATIONS OF DEVICES

CROSS-REFERENCE TO RELATED APPLICATION(S)

This U.S. non-provisional application claims the benefit of priority under 35 U.S.C. § 119 to Korean Patent Application No. 10-2016-0044046, filed on Apr. 11, 2016, in the Korean Intellectual Property Office (KIPO), the entire contents of which are incorporated herein by reference.

BACKGROUND

Field

One or more example embodiments relate to a method, apparatus, system, and/or non-transitory computer readable medium for interworking between applications of devices.

Description of Related Art

As a type of software capable of exchanging messages and/or data in real time on the Internet, a messenger service may verify whether a user is connected to the Internet and may make an immediate response. Thus, compared to an email program, the messenger service enables users to exchange messages at high speed and while working on a computer and/or other processing device. The messenger service may support multilateral chat and voice chat, and may also provide various types of functions capable of transmitting a large video file, sending text messages to a mobile phone, and the like.

Meanwhile, with the development of communication technology, a messenger function that were only enabled on desktop computers, such as a personal computer (PC) or a laptop computer, has been recently transported for use with mobile devices. Once a user connects to a mobile messenger server using a mobile client, for example, a messenger application, installed on a mobile device, the mobile messenger server may connect the mobile client corresponding to the account of the user and may provide a service so that the user may transmit and receive messages and data.

In addition, such a mobile messenger function has been expanded to a desktop messenger function, and users may use a plurality of electronic devices associated with a single account. Accordingly, a plurality of messenger clients may be available with respect to a single account of a user. For example, the user may use a messenger service through a desktop client of a messenger service, which supports a desktop computer, and a mobile client of the mobile device, using a single account.

However, if the user is to take a photo and transmit the photo while having a conversation through a specific communication session, for example, a chatroom at a desktop client, or to transmit a file, such as a photo, a sound source, a video, etc., stored on a mobile device, the user may need to proceed with a cumbersome process of executing a mobile client through the mobile device, retrieving a corresponding communication session, and taking a photo and transmitting a captured image through the communication session, or retrieving a file stored on the mobile device and transmitting the file through the communication session. This may cause a discontinuity of action at the desktop client which may cause user inconveniences.

SUMMARY

One or more example embodiments provide a method, apparatus, system, and/or non-transitory computer readable medium for interworking between applications of devices that may process an action associated with a single communication session through interworking between applications installed on a plurality of electronic devices, respectively, in response to a presence of the plurality of electronic devices of a user identified in association with a single account of the user.

According to an aspect of at least one example embodiment, there is provided a non-transitory computer-readable medium storing computer readable instructions, which when executed by at least one processor, cause the at least one processor to perform a method for application interworking between devices. The application interworking method includes establishing a communication session associated with an account of a user of a first electronic device using a first application executed on the first electronic device, generating a user interface for creating a control instruction associated with the communication session, transmitting a control instruction that includes a session identifier of the communication session to a second electronic device associated with the account of the user, in response to an input through the user interface, the control instruction further including instructions for the second electronic device to execute an action associated with the communication session corresponding to the session identifier by a second application executed on the second electronic device.

According to an aspect of at least one example embodiment, there is provided a non-transitory computer-readable medium storing computer readable instructions, which when executed by at least one processor, cause the at least one processor to perform a method for application interworking between devices. The application interworking method includes receiving, at a second electronic device, a control instruction created through a first application executed on a first electronic device, the control instruction including a session identifier of a communication session established using an account of a user of the first electronic device, retrieving or creating data corresponding to the control instruction under control of a second application executed on the second electronic device, in response to the received control instruction, and transmitting the retrieved or created data through the communication session corresponding to the session identifier.

According to an aspect of at least one example embodiment, there is provided a method for interworking between applications of devices, the method including receiving, at a second electronic device, a control instruction created through a first application executed on a first electronic device, the control instruction including a session identifier of a communication session established using an account of a user of the first electronic device, retrieving or creating data corresponding to the control instruction using a second application executed on the second electronic device, in response to the received control instruction, and transmitting the retrieved or created data through the communication session corresponding to the session identifier.

According to some example embodiments, in response to a presence of a plurality of electronic devices of a user identified in association with a single account of the user, it is possible to process an action associated with a single communication session through interworking between applications installed on the plurality of electronic devices, respectively.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
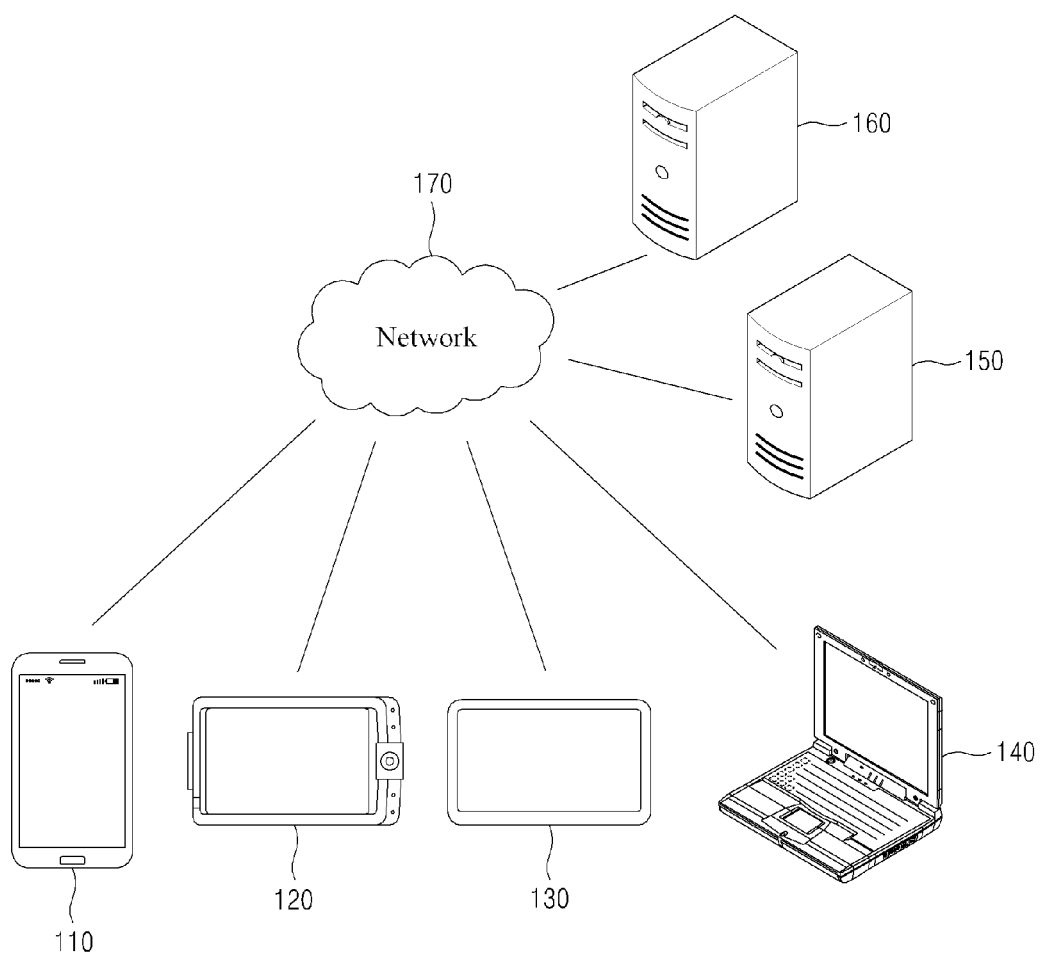
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices, for example, a first electronic device (electronic device 1) 110, a second electronic device (electronic device 2) 120, a third electronic device (electronic device 3) 130, and a fourth electronic device (electronic device 4) 140, a plurality of servers 150 and 160, and a network 170. FIG. 1 is provided as an example only and thus, the number of electronic devices and/or the number of servers are not limited thereto, and there may be a greater or lesser number of electronic devices and/or servers than shown. For example, the servers 150 and 160 may be combined into a single server, etc.

Each of the plurality of electronic devices, for example, the first through fourth electronic devices 110, 120, 130, and 140, may be a fixed terminal or a mobile terminal configured as a computer device. For example, the plurality of electronic devices, for example, the first through fourth electronic devices 110, 120, 130, and 140, may be a smartphone, a mobile phone, a personal navigation device, a personal computer (PC), a laptop computer, a digital broadcasting terminal, a personal digital assistant (PDA), a portable multimedia player (PMP), a tablet, an Internet of Things (IoT) device, a home automation device, a game console, a virtual reality device, an augmented reality device, a smart device, and the like. For example, the first electronic device 110 may communicate with other electronic devices, for example, the second electronic device 120, the third electronic device 130, and/or the fourth electronic device 140, and/or the servers 150 and/or 160, etc., over the network 170 in a wired communication manner and/or in a wireless communication manner.

The communication scheme is not particularly limited and may include a communication method that uses, for example, a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices, for example, the first through fourth electronic devices 110, 120, 130, and/or 140, over the network 170.

For example, the server 160 may be a file distribution system that distributes to the plurality of electronic devices, for example, the first through fourth electronic devices 110, 120, 130, and/or 140, one or more files for installing a messenger client, for example, a messenger application with a messenger function. In this case, the server 150 may be a messenger system that provides a messenger function to messenger clients on which the messenger application is installed. For example, a user of the first electronic device 110 may connect to the server 150 using the messenger client installed on the first electronic device 110, and may proceed with an electronic conversation with the fourth electronic device 140 on which the messenger client has been installed, etc. A communication session, for example, a chatroom of a messenger service, may be established between an account of a first user that is the user of the first electronic device 110 and an account of a second user that is a user of the fourth electronic device 140, but the example embodiments are not limited thereto and there may be a greater number of users and/or devices connected to a single communication session. The server 150 may route data transmitted and received through the corresponding communication session.

Also, a plurality of devices, for example, the electronic devices 110 and 120, may be identified in association with a single account of the first user. For example, the first electronic device 110 may be a PC of the first user and the second electronic device 120 may be a smartphone of the first user. In this case, data transmitted from the fourth electronic device 140 through the communication session may be transmitted to the second electronic device 120 as well as the first electronic device 110, etc.

Figure 2:
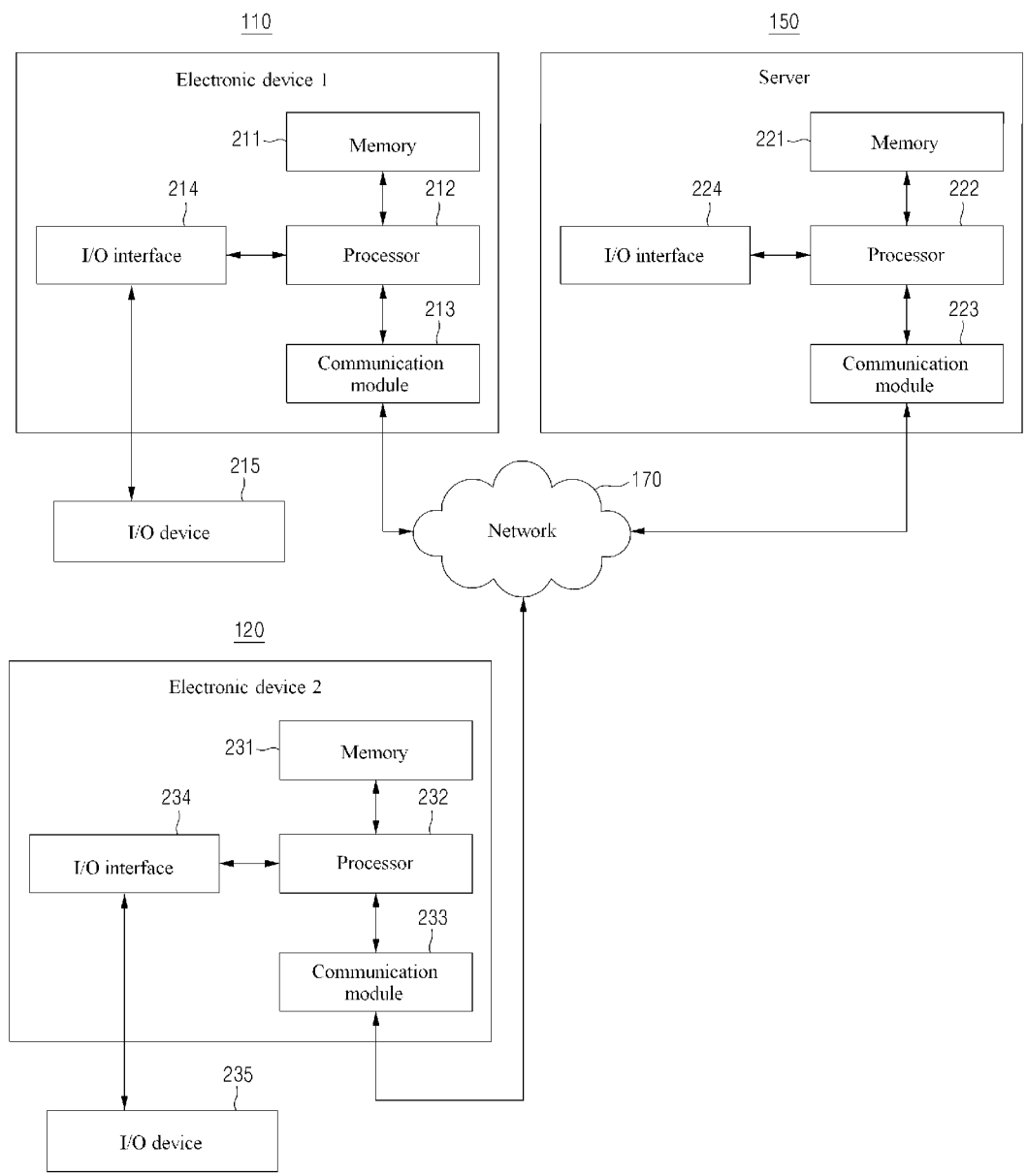
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates configurations of the first and second electronic devices 110 and 120 as an example for an electronic device, and also illustrates a configuration of the server 150 as an example for a single server. The same or similar constituent elements may be applicable to other electronic devices, for example, the third electronic device 130 and/or the fourth electronic device 140, or the server 160, and also to still other electronic devices or still other servers not shown in the figures.

Referring to FIG. 2, the first electronic device 110 may include a memory 211, at least one processor 212, a communication module 213, and an input/output (I/O) interface 214, but is not limited thereto. Additionally, in FIG. 2, the server 150 may include a memory 221, at least one processor 222, a communication module 223, and an I/O interface 224, etc., and the second electronic device 120 may include a memory 231, at least one processor 232, a communication module 233, and an I/O interface 234, etc. The memory 211, 221, 231 may include a permanent mass storage device, such as random access memory (RAM), read only memory (ROM), a disk drive, etc., as a non-transitory computer-readable storage medium. Here, ROM and the permanent mass storage device may be included as permanent storage devices separate from the memory 211, 221, 231. Also, an OS and at least one program code, for example, a code for an application for providing a specific service, a browser, etc., installed and executed on the first electronic device 110, may be stored on the memory 211, 221, 231. Such software constituent elements may be loaded from another non-transitory computer-readable storage medium separate from the memory 211, 221, 231 using a drive mechanism. The other non-transitory computer-readable storage medium may include, for example, a floppy drive, a disk, a tape, a Bluray/DVD/CD-ROM drive, a memory card, etc. According to other example embodiments, software constituent elements may be loaded to the memory 211, 221, 231 through the communication module 213, 223, 233 instead of, or in addition to, the non-transitory computer-readable storage medium. For example, at least one program may be loaded to the memory 211, 221, 231 based on a program, for example, the application, installed by files provided over the network 170 from developers and/or a file distribution system, for example, the server 160, which provides an installation file of the application.

The processor 212, 222, 232 may be configured to process computer-readable instructions, for example, the aforementioned at least one program code, of a computer program by performing basic arithmetic operations, logic operations, and I/O operations. The computer-readable instructions may be provided from the memory 211, 221, 231 and/or the communication module 213, 223, 233 to the processor 212, 222, 232. For example, the processor 212, 222, 232 may be configured to execute received instructions in response to the program code stored on the storage device, such as the memory 211, 222, 232.

The communication module 213, 223, 233 may provide a function for communication between the first, second electronic device 110, 120 and the server 150 over the network 170, and may provide a function for communication with another electronic device, for example, the third electronic device 130 or another server, for example, the server 160. For example, the processor 212 of the first electronic device 110 may transfer a request, for example, a request for a messenger service, created based on program code stored on the storage device such as the memory 211, to the server 150 over the network 170 under control of the communication module 213. Conversely, a control signal, a computer readable instruction, content, a file, etc., provided under control of the processor 222 of the server 150 may be received at the first electronic device 110 through the communication module 213 of the first electronic device 110 by going through the communication module 223 and the network 170. For example, a control signal, a computer readable instruction, etc., of the server 150 received through the communication module 213 may be transferred to the processor 212 or the memory 211, and content, a file, etc., may be stored on a storage medium further includable in the first electronic device 110.

The I/O interface 214, 224, 234 may be a device used for interface with one or more I/O devices, such as I/O device 215, I/O device 235, etc. For example, an input device may include a keyboard, a mouse, a touchscreen, a camera, a microphone, etc., and an output device may include a display for displaying a communication session of an application, a speaker, a haptic feedback device, etc. As another example, the I/O interface 214 may be a device for interface with an apparatus in which an input function and an output function are integrated into a single function, such as a touch screen. In detail, when processing instructions of the computer program loaded to the memory 211, the processor 212 of the first electronic device 110 may display a service screen configured using data provided from the server 150 or the second electronic device 120, or may display content on a display through the I/O interface 214. An example of the I/O device of the server 150 is omitted in FIG. 2.

According to other example embodiments, the first electronic device 110, the second electronic device 120, and the server 150 may include a greater or lesser number of constituent elements than the number of constituent elements shown in FIG. 2. For example, the first electronic device 110 may include at least a portion of the I/O device 215, and/or may further include other constituent elements, for example, a transceiver, a global positioning system (GPS) module, a camera, a variety of sensors, a database, and the like. In detail, if the first electronic device 110 is a smartphone, the first electronic device 110 may be configured to further include a variety of constituent elements, for example, an accelerometer sensor, a gyro sensor, a camera, various physical buttons, a button using a touch panel, an I/O port, a motor for providing vibration feedback, etc., which are generally included in the smartphone.

Figure 3:
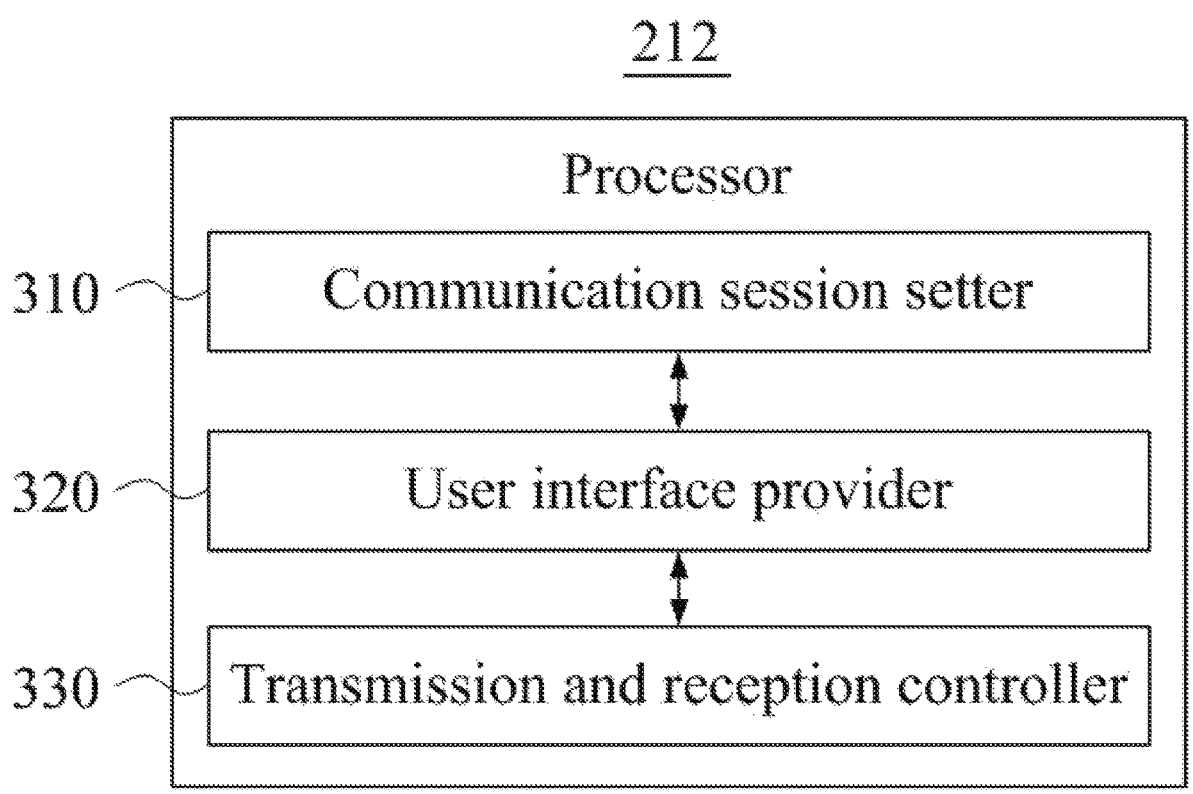
FIG. 3 is a block diagram illustrating an example of constituent elements included in at least one processor of a first electronic device according to at least one example embodiment.
Figure 4:
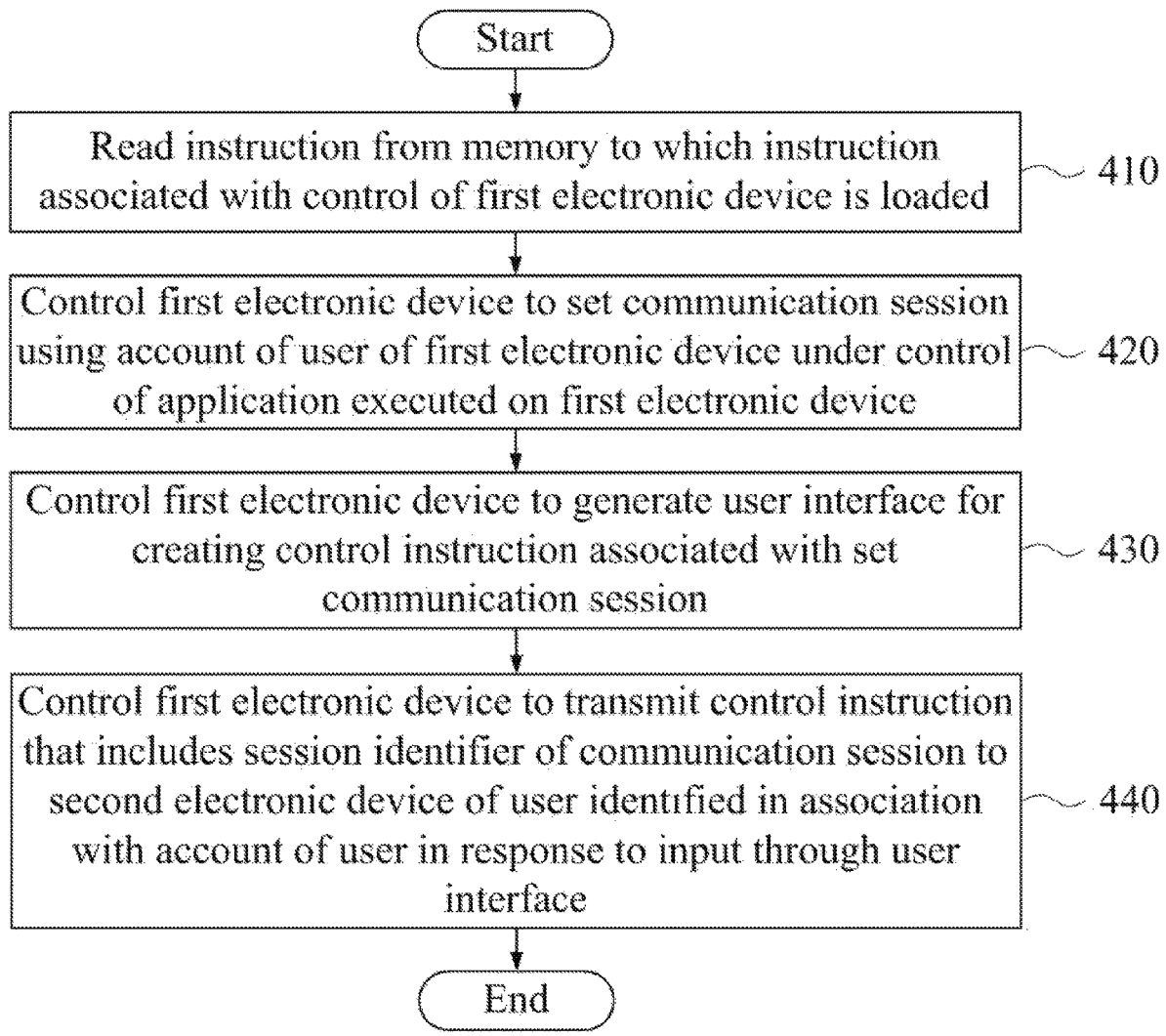
FIG. 4 is a flowchart illustrating an example of a method performed at a first electronic device according to at least one example embodiment.

FIG. 3 is a diagram illustrating an example of constituent elements included in at least one processor of a first electronic device according to at least one example embodiment, and FIG. 4 is a flowchart illustrating an example of a method performed at a first electronic device according to at least one example embodiment.

The first electronic device may be configured as the first electronic device 110, and may configure a system for the interworking of applications between devices (also referred to as an application interworking system). Referring to FIG. 3, the at least one processor 212 of the first electronic device 110 may include a communication session setter 310, a user interface provider 320, and a transmission and reception controller 330 as constituent elements. The processor 212 and the constituent elements of the processor 212 may control the first electronic device 110 to perform operations, such as operations 410 through 440 of FIG. 4, included in a method for the interworking of applications between devices (also referred to as an application interworking method). Here, the processor 212 and the constituent elements of the processor 212 may be configured to execute computer readable instructions according to code of at least one program and code of an OS included in the memory 211. Also, the constituent elements of the processor 212 may be representations of different functions performed at the processor 212 in response to a control instruction provided from the program code stored on the first electronic device 110, or in other words, the control instruction may cause the processor 212 to execute the functions of the illustrated constituent elements of FIG. 3. For example, the communication session setter 310 may be a functional representation of the processor 212 functionality that controls the first electronic device 110 to set a communication session in response to the aforementioned instruction.

According to FIG. 4, in operation 410, the communication session setter 310 may read an instruction (e.g., computer readable instruction) from the memory 211 to which the instruction associated with control of the first electronic device 110 is loaded. In this case, the read instruction may include at least a portion of instructions to control the processor 212 to perform operations 420 through 440.

In operation 420, the communication session setter 310 may control the first electronic device 110 to set a communication session using an account of a user of the first electronic device 110 under control of an application executed on the first electronic device 110. For example, the communication session setter 310 may control the first electronic device 110 to connect to the server 150 under control of the application executed on the first electronic device 110, and may control the first electronic device 110 to request the server 150 to establish and/or set a communication session with an account of at least one other user using the account of the user of the first electronic device 110. The communication session created at the server 150 may correspond to a chatroom of a messenger service and each communication session may be identified based on a session identifier. Additionally, while the at least one example embodiment of FIG. 4 discloses that the server 150 establishes and controls the communication session between the two or more users and their respective electronic devices, the example embodiments are not limited thereto. For example, in other example embodiments the operations of the server 150 may be performed by at least one of the electronic devices, e.g., first electronic device 110, etc., and the communication session may be established and/or controlled by the electronic device.

In operation 430, the user interface provider 320 may control the first electronic device 110 to generate and/or provide a user interface for creating a control instruction associated with the set communication session. For example, the user interface provider 320 may control the first electronic device 110 to generate and/or provide a specific user interface within the chatroom under the control of the application executed on the first electronic device 110. The user interface may include a function that enables the user to instruct creation of a control instruction for transferring a specific control instruction to one or more other electronic devices, for example, the second electronic device 120.

In operation 440, in response to an input through the user interface, the transmission and reception controller 330 may control the first electronic device 110 to transmit the control instruction including the session identifier of the communication session to the one or more other electronic devices, e.g., the second electronic device 120 of the user identified in association with the account of the user. For example, the control instruction may be transferred to the second electronic device 120 through the server 150, and/or may be transferred directly from the first electronic device 110 to the second electronic device 120. Here, the server 150 may be a system that routes data transmitted on the communication session.

Here, through the application executed on the second electronic device 120, the second electronic device 120 may be controlled to execute an action associated with the communication session corresponding to the session identifier. For example, the second electronic device 120 may execute the application installed on the second electronic device 120 in response to the received control instruction, even if the application was not previously executing. If the corresponding application is already executing, the execution of the application may be omitted. The application executed on the second electronic device 120 may provide an instruction to control the second electronic device 120 to perform the action corresponding to the control instruction. In response to the provided instruction, the second electronic device 120 may execute the action associated with the communication session corresponding to the session identifier.

Here, the application executed on the first electronic device 110 and the application executed on the second electronic device 120 may include different versions of an application for providing the messenger service. For example, when it is assumed that the first electronic device 110 is a PC and the second electronic device 120 is a smartphone, the application executed on the first electronic device 110 may be a messenger application of a PC version and the application executed on the second electronic device 120 may be a messenger application of a mobile version. Additionally, the versions of the applications may be different due to the electronic devices executing different operating systems, e.g., Android, iOS, Windows, Linux, Unix, etc.

In this case, the communication session set using the account of the user may correspond to a chatroom created at the messenger service. For example, a communication session set between the account of the user and an account of a friend of the user may correspond to a chatroom created to transmit and receive an instant message, voice call, video chat, images, files, sound, etc. but the example embodiments are not limited thereto. The communication session may be set so that one or more users are participants in the communication session, for example a single user may be the lone participant in the communication session and the communication session is set between a plurality of electronic devices associated with the account of the user, and/or the communication session may be set between the account of the user and the account of at least one other user set as the friend/contact/etc. of the user. Also, the communication session may be set between the account of the user and a specific account such as an artificial intelligence account (e.g., a bot), a business account (e.g., a customer service account), etc.

Figure 5:
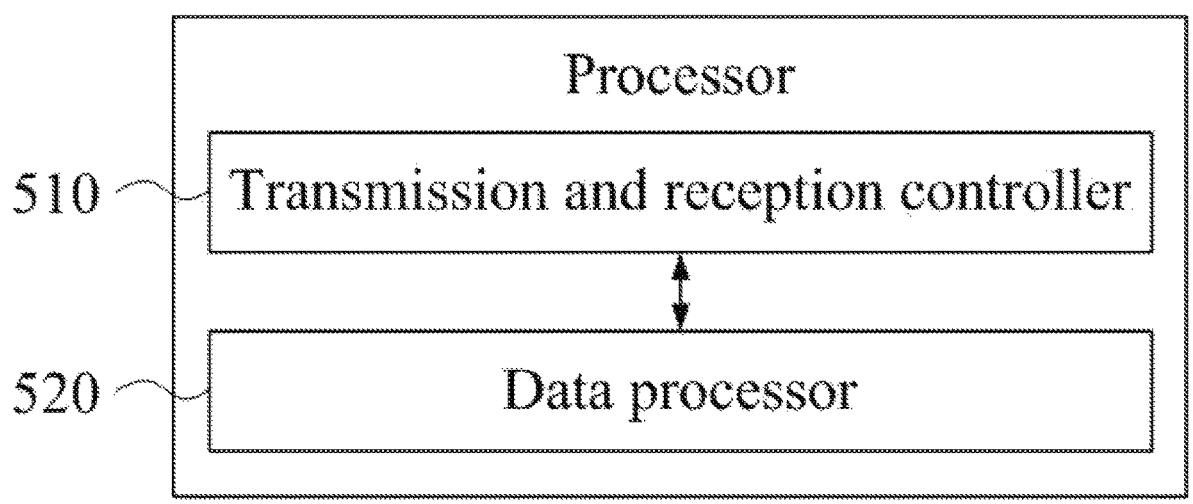
FIG. 5 is a block diagram illustrating an example of constituent elements included in at least one processor of a second electronic device according to at least one example embodiment.
Figure 6:
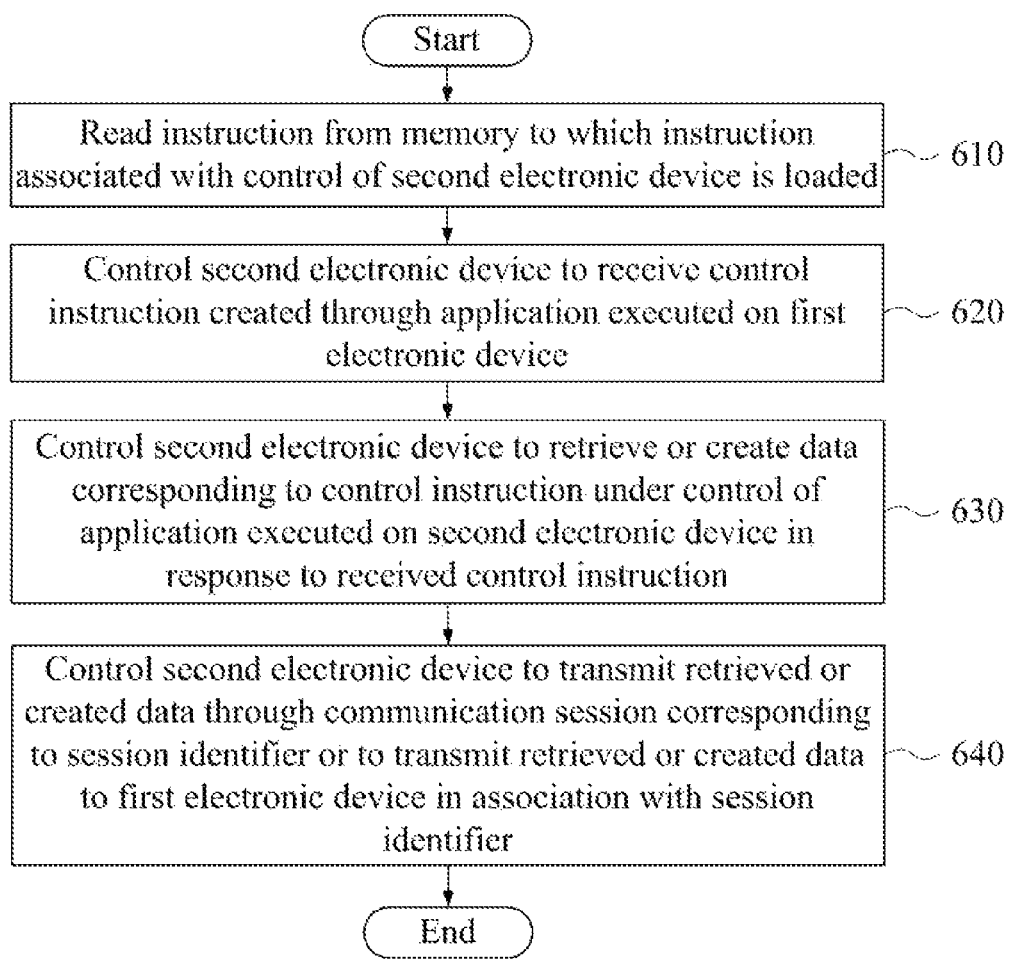
FIG. 6 is a flowchart illustrating an example of a method performed at a second electronic device according to at least one example embodiment.

FIG. 5 is a block diagram illustrating an example of constituent elements included in at least one processor of a second electronic device according to at least one example embodiment, and FIG. 6 is a flowchart illustrating an example of a method performed at a second electronic device according to at least one example embodiment.

The second electronic device may be configured as the second electronic device 120, and may configure an application interworking system according to at least one example embodiment. Referring to FIG. 5, the processor 232 of the second electronic device 120 may include a transmission and reception controller 510, a data processor 520, etc., as constituent elements. The processor 232 and the constituent elements of the processor 232 may control the second electronic device 120 to perform operations, such as operations 610 through 640 of FIG. 6, included in an application interworking method. Here, the processor 232 and the constituent elements of the processor 232 may be configured to execute instructions according to code of at least one program and code of an OS included in the memory 231. Also, the constituent elements of the processor 232 may be representations of different functions performed at the processor 232 in response to an instruction provided from the program code stored on the second electronic device 120, or in other words, the instructions may cause the processor 232 to execute the functions of the illustrated constituent elements of FIG. 5. For example, the transmission and reception controller 510 may be a functional representation of the processor 232 functionality that controls the second electronic device 120 to receive a control instruction in response to the aforementioned instruction.

In operation 610, the processor 232 may read an instruction from the memory 231 to which the instruction associated with control of the second electronic device 120 is loaded. In this case, the read instruction may include at least a portion of instructions to control the processor 232 to perform operations 620 through 640.

In operation 620, the transmission and reception controller 510 may control the second electronic device 120 to receive a control instruction created through the application executed on the first electronic device 110. As described above with reference to FIGS. 3 and 4, the control instruction may include a session identifier of the communication session established and/or set using the account of the user of the first electronic device 110, and may be transferred to the second electronic device 120 through the server 150 and/or transferred directly from the first electronic device 110.

In operation 630, the data processor 520 may control the second electronic device 120 to retrieve or create data corresponding to the control instruction under the control of the application being executed on the second electronic device 120 in response to the received control instruction. Here, retrieving of data may indicate retrieving a file stored on the second electronic device 120. However, file retrieval is provided as an example only and the possible commands to be executed by the example embodiments are not limited thereto and may further include opening, closing, executing, creating, modifying, deleting, and/or other file operations, etc. If necessary, retrieving of data may include retrieving data from a storage space on a website and/or network (e.g., cloud storage network, etc.) accessible through the second electronic device 120. Also, the creation of data may include creating data at the second electronic device 120. For example, data created and/or captured through I/O devices included in (and/or connected to) the second electronic device 120, such as a camera included in the second electronic device 120, a keyboard, a touchscreen, a microphone, etc., may be included in the data being created (e.g., images, videos, sound files, office documents, etc.).

In operation 640, the transmission and reception controller 530 may control the second electronic device 120 to transmit the retrieved or created data through the communication session corresponding to the session identifier and/or to transmit the retrieved or created data, and/or perform other file operations, to the first electronic device 110 in association with the session identifier. Accordingly, the user may control the second electronic device 120 using a separate electronic device (e.g., the first electronic device 110) to transmit the data retrieved or created (and/or perform other file operations) at the second electronic device 120 through a specific communication session (e.g., a second communication session with one or more other users) or to transmit the retrieved or created data to the first electronic device 110.

As described above, without a separate (and/or dedicated) connection process, for example, a remote control setting, etc., between the first electronic device 110 and the second electronic device 120, inter-device control may be processed through interworking of applications between devices using the installed messenger application. In other words, even if the first electronic device 110 and/or the second electronic device 120 do not natively support connection and/or remote control operations, the installed messenger application may provide inter-device control through the interworking of the messenger applications.

For example, without a need to proceed with a process for connecting the electronic devices 110 and 120 to each other, and without a need to proceed with a process of detecting a specific chatroom through the second electronic device 120 and transmitting data through the chatroom, the user using the first electronic device 110 may transmit a file stored on the second electronic device 120 to the first electronic device 110 through the communication session in use at the first electronic device 110.

Hereinafter, various example embodiments in which the first electronic device 110 transmits a control instruction to control the second electronic device 120 to execute a specific action will be described.

In at least one example embodiment, an action associated with a communication session may include an action of providing a selection interface (e.g., generating a selection graphical user interface (GUI)) for selecting a file stored on the second electronic device 120 and transmitting the selected file through a communication session corresponding to a session identifier. For example, the data processor 520 of the second electronic device 120 may provide (e.g., generate) the selection interface for selecting a file stored on the second electronic device 120 and may control the second electronic device 120 to verify the file selected through the selection interface. Here, the file may be selected by the user of the second electronic device 120. In this case, the transmission and reception controller 510 of the second electronic device 120 may control the second electronic device 120 to transmit the verified file through the communication session corresponding to the session identifier in operation 640. That is, the user may transmit the selected file through a specific communication session by simply selecting the desired file through the selection interface displayed through the second electronic device 120. While the example embodiments illustrates the selection and transmittal of a file, the example embodiments are not limited thereto and other file operations may be performed using the selection interface (e.g., opening, closing, executing, creating, modifying, deleting, etc., files).

Figure 7:
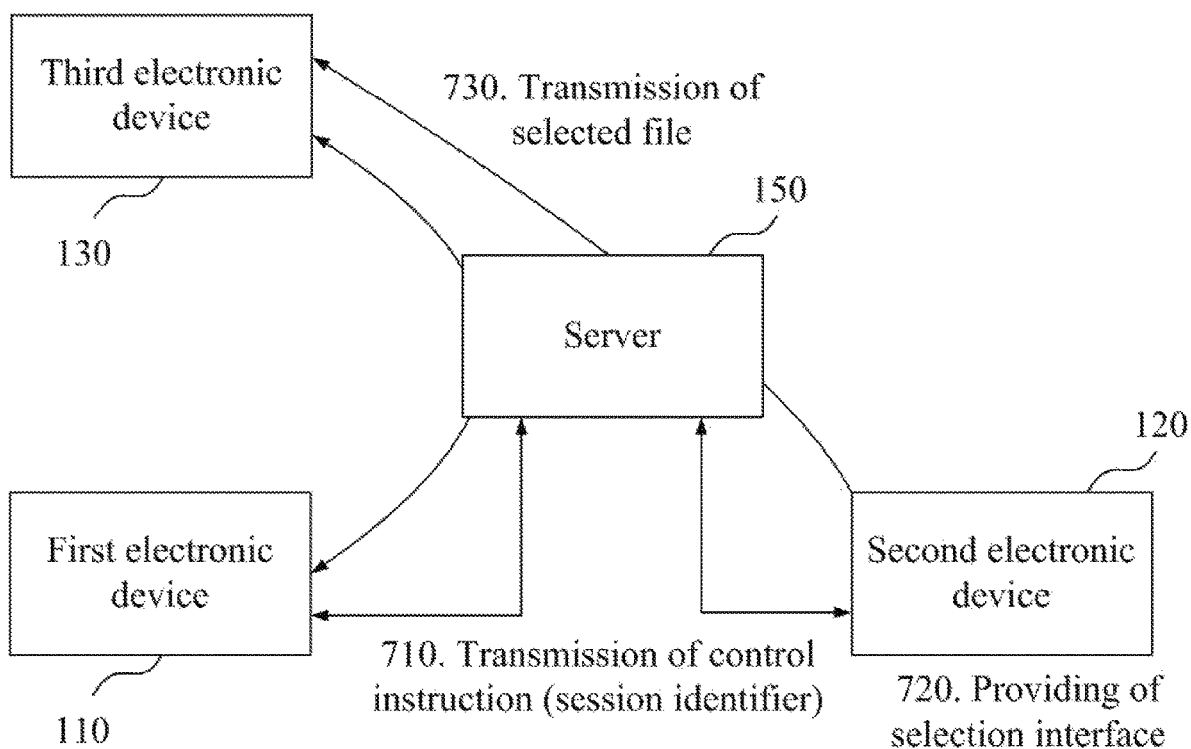
FIG. 7 illustrates an example of a file selection and transmission process according to at least one example embodiment.

FIG. 7 illustrates an example of a file selection and transmission process according to at least one example embodiment. Here, it is assumed that a conversation between a first user that is a user of the first electronic device 110 and a second user that is a user of the third electronic device 130 is being conducted through the messenger service. The conversation may proceed based on data transmitted and received between an account of the first user at the first electronic device 110 and an account of the second user at the third electronic device 130, and the server 150 may route transmission and reception of the data. Additionally, even if the conversation is not occurring in real-time, the same process may be performed if the communication session is set (e.g., established).

In this instance, the first user may desire to transmit, to the third electronic device 130, a file stored on the second electronic device 120 which may be another electronic device of the first user (e.g., an electronic device that the first user owns, operates, has an account associated with, etc.). In similar circumstances in the related art, the first user would experience a cumbersome process, such as physically accessing the second electronic device (e.g., moving to the location where the second electronic device is located and begin operation of the second electronic device, etc.), retrieving a file that the first user desires to transmit using the second electronic device 120 by, for example, executing a separate gallery application or other file operation application (e.g., finding an icon of the gallery application on the user interface of the second electronic device, etc.) and selecting a desired file, begin retrieving a communication session, for example, a chatroom, a text messaging session, creating an email, etc., associate/set/establish the communication session with the second user, and transmit the retrieved file through the communication session, for example, executing a messenger application for transmitting the retrieved file and retrieving a desired chatroom from a chatroom list of the executed messenger application and transmitting the retrieved file.

Meanwhile, in at least some of the example embodiments, the first user may transmit a control instruction to the second electronic device 120 for performing a file operation on a file stored on the second electronic device 120 (e.g., selecting and transmitting a file, etc.) through the user interface provided from (and/or generated by) the first electronic device 110. Then, the first user may perform a file operation, such as selecting one or more files for transmission, through the selection interface (e.g., a listing of files, applications, etc., associated with the first user on the second electronic device 120) that is automatically transmitted from the second electronic device 120 to the first electronic device 110 in response to the control instruction. Additionally, the second electronic device 120 may automatically retrieve a corresponding communication session using a session identifier included in the control instruction, and may perform the requested file operation (e.g., transmit the selected file, etc.) using and/or through the communication session, such as transmitting the file selected by the first user to the third electronic device 130.

Referring to FIG. 7, in operation 710, the first electronic device 110 may transmit a file selection transmission request, for example, a control instruction, that includes a session identifier to the second electronic device 120 through the server 150.

In operation 720, the second electronic device 120 may generate and/or provide a selection interface for performing file operations, such as selecting a file, etc. The selection interface may be transmitted to the first electronic device 110 and/or may be provided to a user of the second electronic device 120.

In operation 730, the second electronic device 120 may transmit a file selected through the selection interface, either at the first electronic device 110 or the second electronic device 120, to the third electronic device 130 through the server 150 using a communication session corresponding to the session identifier.

Optionally, in response to the received control instruction, a notification for notifying reception of the control instruction may be registered to the second electronic device 120, and an action associated with the communication session corresponding to the session identifier may be executed in response to a response input from the first user to the notification. The notification may be provided to the first user in a form of a dialog, a push pop-up, and the like. Also, a process of receiving a verification of the first user of the transmission of the selected file through a specific communication selection after selecting the file may be added. A process of receiving a verification of the first user regarding whether to execute an action through the notification or receiving a verification of the first user on transmission of data through a specific communication session, etc., may be added to the following example embodiments. However, a repeated description is omitted.

According to other example embodiments, the action associated with the communication session may include an action of executing an application and/or operating I/O devices, such as a camera, a microphone, an image creation application, a notepad application, etc., included in the second electronic device 120, and transmitting the result (e.g., an image created using the executed camera, a sound file created using the executed microphone, a file modified using an application, etc.) through the communication session corresponding to the session identifier. For example, in operation 630, the data processor 520 of the second electronic device 120 may control the second electronic device 120 to execute the camera included in the second electronic device 120 and to create the image using the executed camera. Here, taking a photo may be performed by the user of the second electronic device 120, may be taken automatically without the input of a user physically handling the second electronic device 120, and/or may be remotely controlled by the user of the first electronic device 110. In this case, the transmission and reception controller 510 of the second electronic device 120 may control the result of action, such as the captured image, and cause the result to be transmitted through the communication session corresponding to the session identifier in operation 640. That is, the user may transmit the captured image through the specific communication session by simply capturing the image, such as a photo, using the camera executed on the second electronic device 120.

Figure 8:
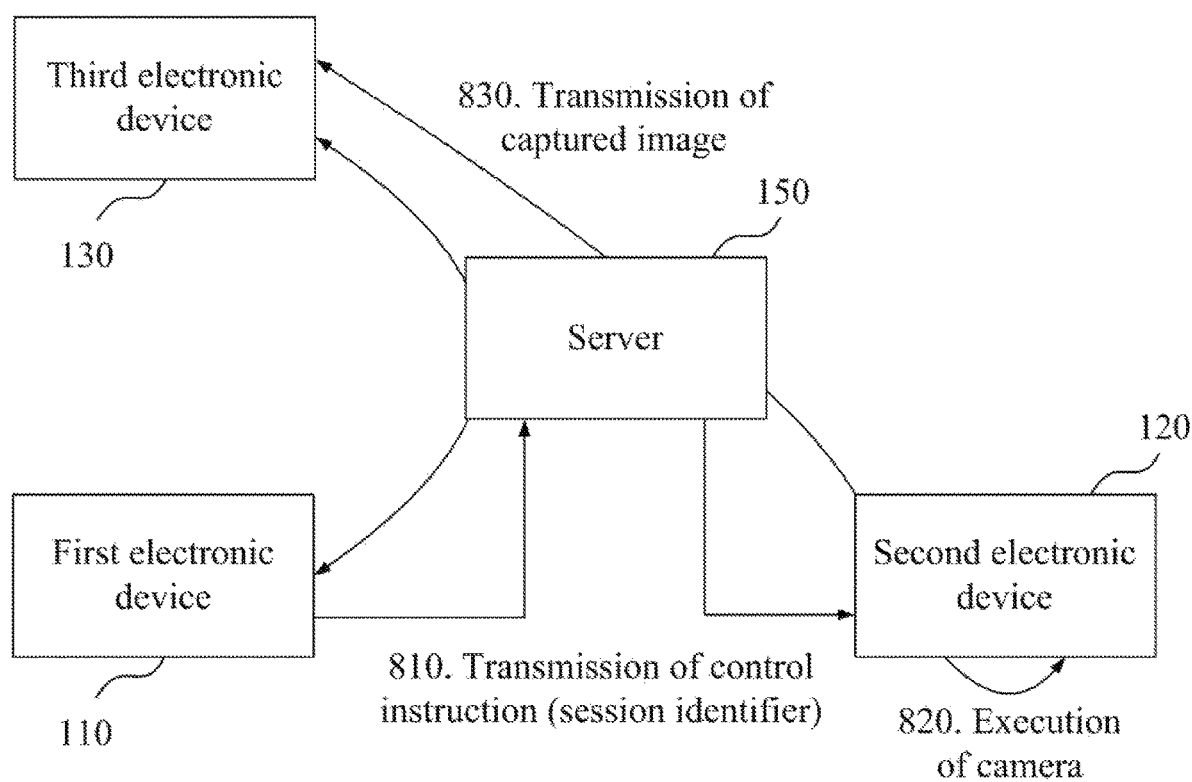
FIG. 8 illustrates an example of a photo taking and transmitting process according to at least one example embodiment.

FIG. 8 illustrates an example of a photo taking and transmitting process according to at least one example embodiment. Here, it is assumed that a conversation between a first user that is a user of the first electronic device 110 and a second user that is a user of the third electronic device 130 is ongoing through a messenger service, however the example embodiments are not limited thereto and the conversation may include two or more users and/or entities (e.g., artificial intelligence programs, business accounts, etc.). Even in this case, the conversation may proceed based on data transmitted and received between an account at the first user of the first electronic device 110 and an account of the second user at the third electronic device 130, and the server 150 may route transmission and reception of the data.

Here, the first user may desire to take a photo and to transmit a captured image to the third electronic device 130. To this end, in the related art, the first user needs to undertake a cumbersome process, such as taking a photo or a video using the second electronic device 120, for example, a process of executing a camera application (e.g., finding an icon of the camera application and taking a desired photo), retrieve the communication session, for example, a chatroom, etc., established and/or set with the second user, and then transmitting the taken photo through the communication session, for example, by executing a messenger application for transmitting the taken photo and retrieving a desired chatroom from a chatroom list of the executed messenger application and transmitting the taken photo through the chatroom.

Meanwhile, in at least some of the example embodiments, the first user may transmit to the second electronic device 120 (e.g., a digital camera, a smartphone, a tablet, a webcam, a smart home device, a drone, etc.) from a first electronic device 110 (e.g., a PC, a smartphone, a tablet, etc.), a control instruction for taking a photo through the camera provided in the second electronic device 120, and the second electronic device 120 may take a photo through the camera automatically executed in response to the control instruction. Additionally, the second electronic device 120 may automatically retrieve a corresponding communication session using a session identifier included in the control instruction (e.g., start execution of the corresponding messaging application, continue execution of the corresponding messaging application, etc., and then enter the transmission stream of the related communication session using the session identifier via the server 150 and/or through direct communication with the electronic device of the other participant of the communication session), and may transmit the taken photo through the communication session, thereby transmitting an image captured by the first user to the third electronic device 130.

Referring to FIG. 8, in operation 810, the first electronic device 110 may transmit a photo taking and transmitting request and/or other requests, that is, a control instruction that includes a session identifier to the second electronic device 120 through the server 150.

In operation 820, the camera and/or other I/O devices may be automatically executed on the second electronic device 120.

In operation 830, the second electronic device 120 may transmit an image captured through the camera and/or other resulting files to the third electronic device 130 through the server 150 using a communication session corresponding to the session identifier.

According to other example embodiments, the action associated with the communication session may include an action, such as executing the camera included in the second electronic device 120, etc., and transmitting the results, e.g., an image created at the executed camera, etc., to the first electronic device 110 in association with the session identifier. For example, in operation 630, the data processor 520 of the second electronic device 120 may control the second electronic device 120 to execute the camera included in the second electronic device 120 and to create the image using the executed camera. Here, taking a photo may be performed by the user of the second electronic device 120. In this case, the transmission and reception controller 510 of the second electronic device 120 may control the second electronic device 120 to transmit the created image to the first electronic device 110 in association with the session identifier in operation 640. The image associated with the session identifier may be transferred to the first electronic device 110 through the server 150. In this case, the first electronic device 110 may receive the image and may transmit the received mage to the third electronic device 130 through the communication session corresponding to the session identifier. For example, the transmission and reception controller 330 of the first electronic device 110 may control the first electronic device 110 to retrieve the communication session corresponding to the session identifier associated with the image and to transmit the received image through the communication session.

Figure 9:
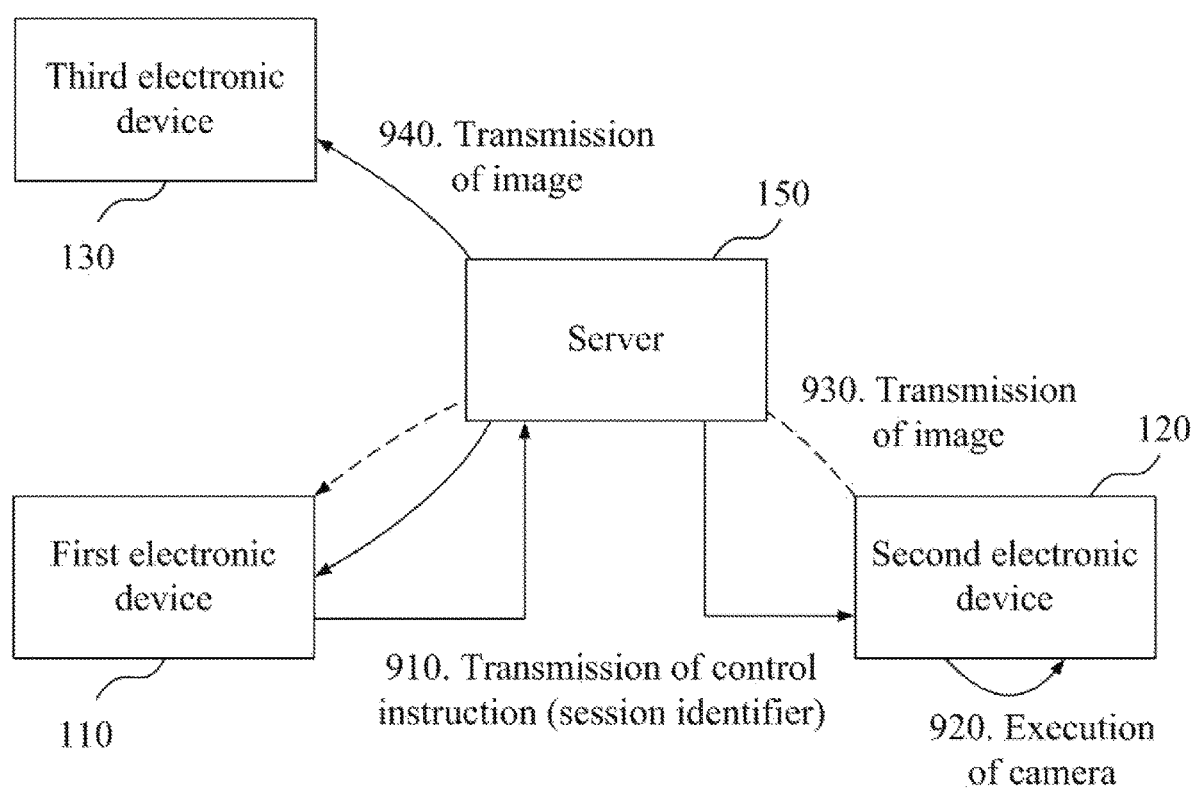
FIG. 9 illustrates another example of a photo taking and transmitting process according to at least one example embodiment.

FIG. 9 illustrates another example of a photo taking and transmitting process according to at least one example embodiment. Here, it is assumed that a conversation between a first user that is a user of the first electronic device 110 and a second user that is a user of the third electronic device 130 is ongoing through a messenger service.

Referring to FIG. 9, in operation 910, the first electronic device 110 may transmit a photo taking and transmitting request and/or other action request, for example, a control instruction that includes a session identifier to the second electronic device 120 through the server 150.

In operation 920, the camera and/or other I/O device may be automatically executed on the second electronic device 120.

In operation 930, the second electronic device 120 may transmit the result, such as an image captured through the camera, to the first electronic device 110 through the server 150 in association with the session identifier. Additionally, the result (e.g., the image) associated with the session identifier may be directly transmitted from the second electronic device 120 to the first electronic device 110 through a near field communication network, such as NFC, Bluetooth, Wi-Fi Direct, WiFi, IR transmission, etc.

In operation 940, the first electronic device 110 may transmit, to the third electronic device 130, the image received through the communication session corresponding to the session identifier associated with the received image. In operation 940, the image may be transmitted to the third electronic device 130 through the server 150. Additionally, according to other example embodiments, the image may be transmitted directly from the first electronic device 110 to the third electronic device 130, and/or may be transmitted directly from the second electronic device 120 to the third electronic device 130.

According to other example embodiments, the first electronic device 110 may receive, from the second electronic device 120, and use a file list of files stored on the second electronic device 120.

Figure 10:
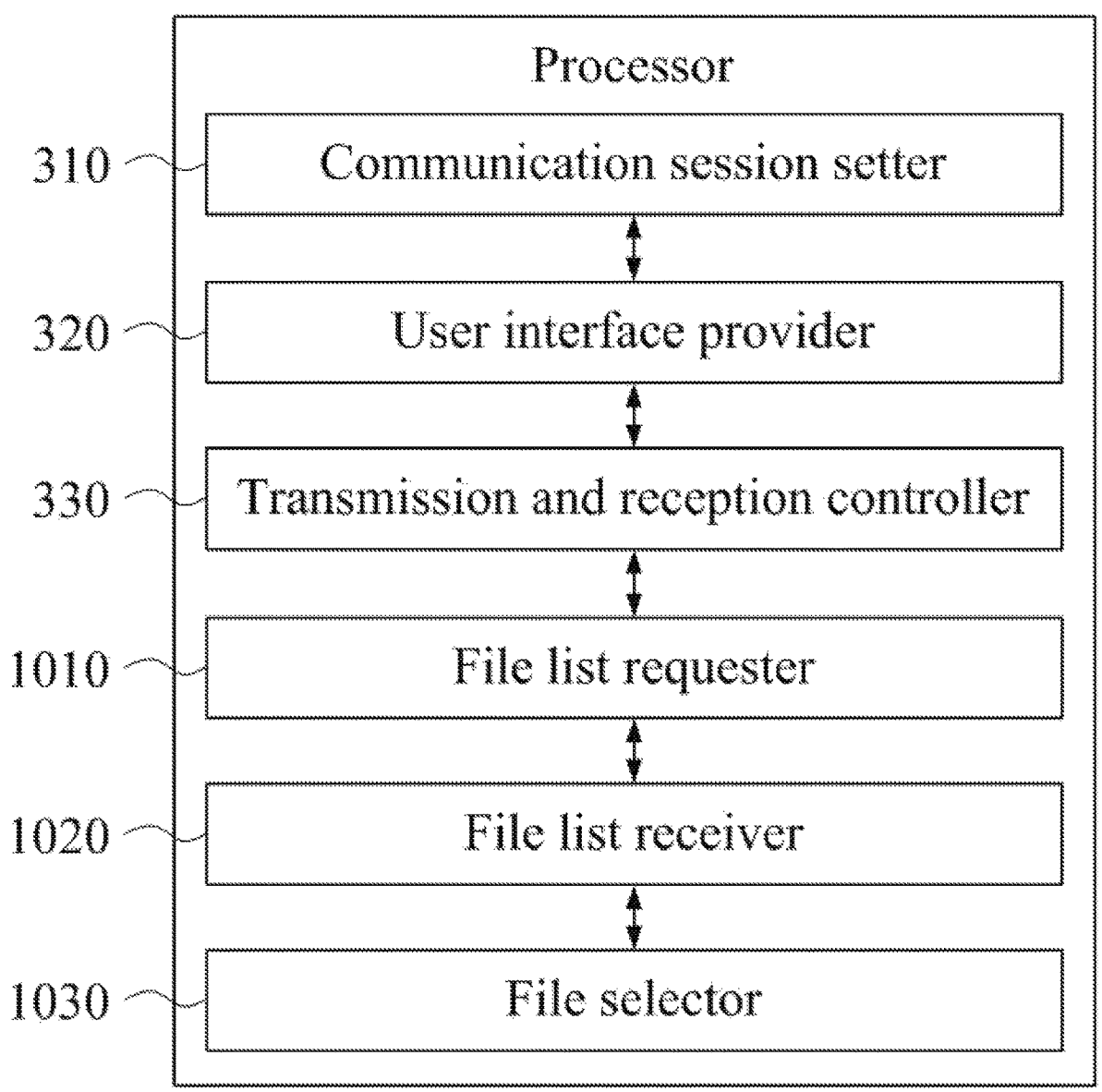
FIG. 10 is a block diagram illustrating another example of constituent elements included in at least one processor of a first electronic device according to at least one example embodiment.
Figure 11:
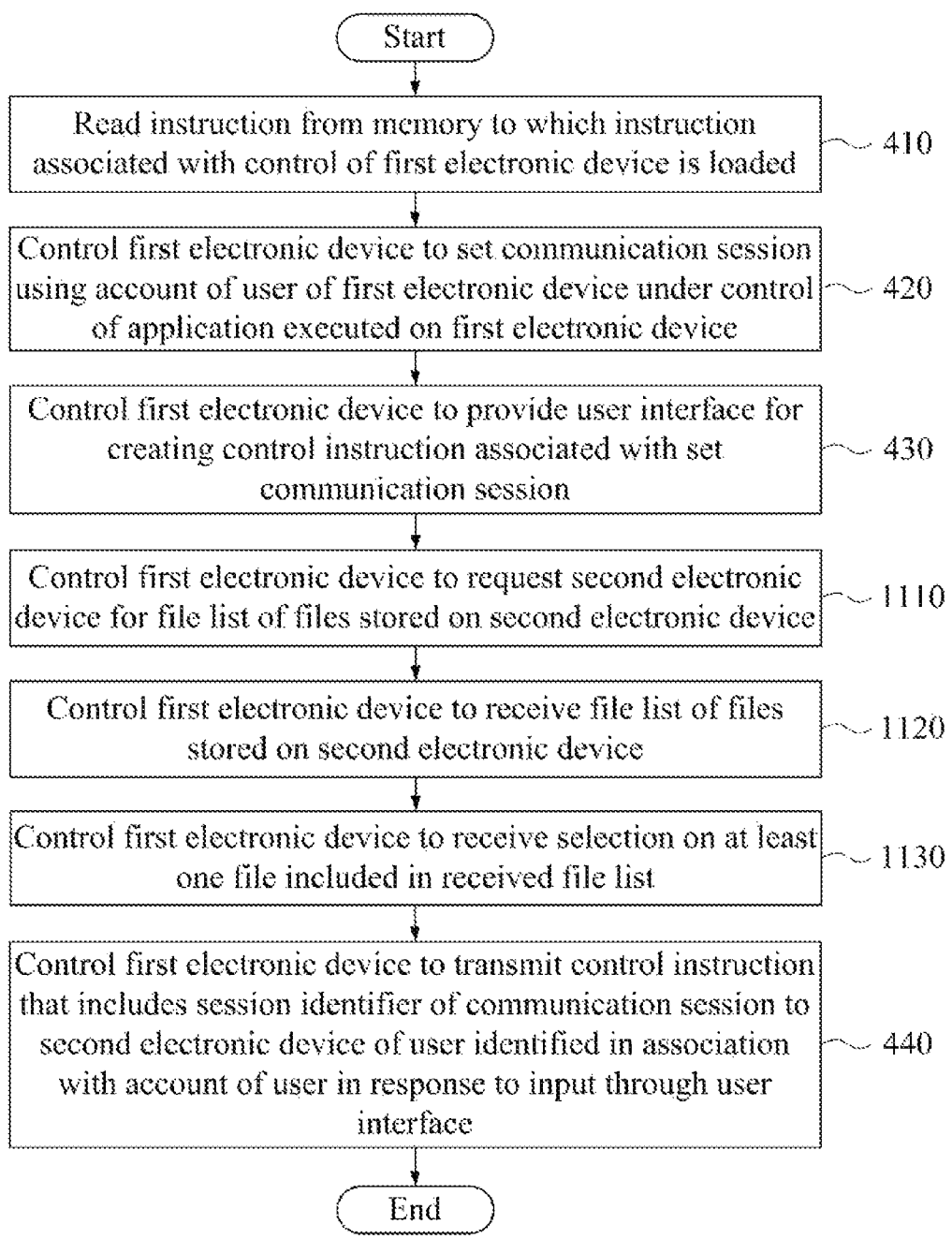
FIG. 11 is a flowchart illustrating another example of a method performed at a first electronic device according to at least one example embodiment.

FIG. 10 is a block diagram illustrating another example of constituent elements included in at least one processor of a first electronic device according to at least one example embodiment, and FIG. 11 is a flowchart illustrating another example of a method performed at a first electronic device according to at least one example embodiment. As described above, the first electronic device may be configured as the first electronic device 110, and the processor 212 of the first electronic device 110 may further include a file list requester 1010, a file list receiver 1020, and a file selector 1030 in addition to the communication session setter 310, the user interface provider 320, and the transmission and reception controller 330 of FIG. 3. Here, the file list requester 1010 and the file list receiver 1020 may be configured to be included in the transmission and reception controller 330, but the example embodiments are not limited thereto. As described above, the constituent elements of the processor 212 may be representations of different functions performed at the processor 212, which may indicate that the transmission and reception controller 330 may include functions of the file list requester 1010 and the file list receiver 1020, or in other words, computer readable instructions may cause the processor 212 to execute the functions of the illustrated constituent elements of FIG. 11. The application interworking method of FIG. 11 may further include operations 1110, 1120, and 1130 in addition to operations 410 through 440 of FIG. 4, but are not limited thereto. Operations 1110, 1120, and 1130 may be performed prior to operation 440 or may be included in operation 440 and thereby performed. An example embodiment of performing 1110, 1120, and 1130 prior to operation 440 will be described with reference to FIG. 11.

In operation 1110, the file list requester 1010 may control the first electronic device 110 to request the second electronic device 120 for a file list of files (and/or I/O device list, application list, etc.) stored on the second electronic device 120. For example, the request transmitted from the first electronic device 110 may be transferred to the second electronic device 120 through the server 150.

In operation 1120, the file list receiver 1020 may control the first electronic device 110 to receive the file list of files (and/or I/O device list, application list, etc.) stored on the second electronic device 120. For example, in response to the received request, the second electronic device 120 may transmit the file list to the first electronic device 110. Here, the file list may be transmitted to the first electronic device 110 through the server 150, but is not limited thereto.

In operation 1130, the file selector 1030 may control the first electronic device 110 to receive a selection on at least one file included in the received file list (and/or selected I/O device, selected application, etc.). The selection (e.g., selection of the at least one file) may be performed by the user of the first electronic device 110. For example, the first electronic device 110 may recognize the selected file in response to the input of the selection of the file.

Here, in operation 440, the transmission and reception controller 330 may control the first electronic device 110 to transmit, to the second electronic device 120, the control instruction that further includes an identifier associated with the selection (e.g., a file identifier of the selected at least one file).

Figure 12:
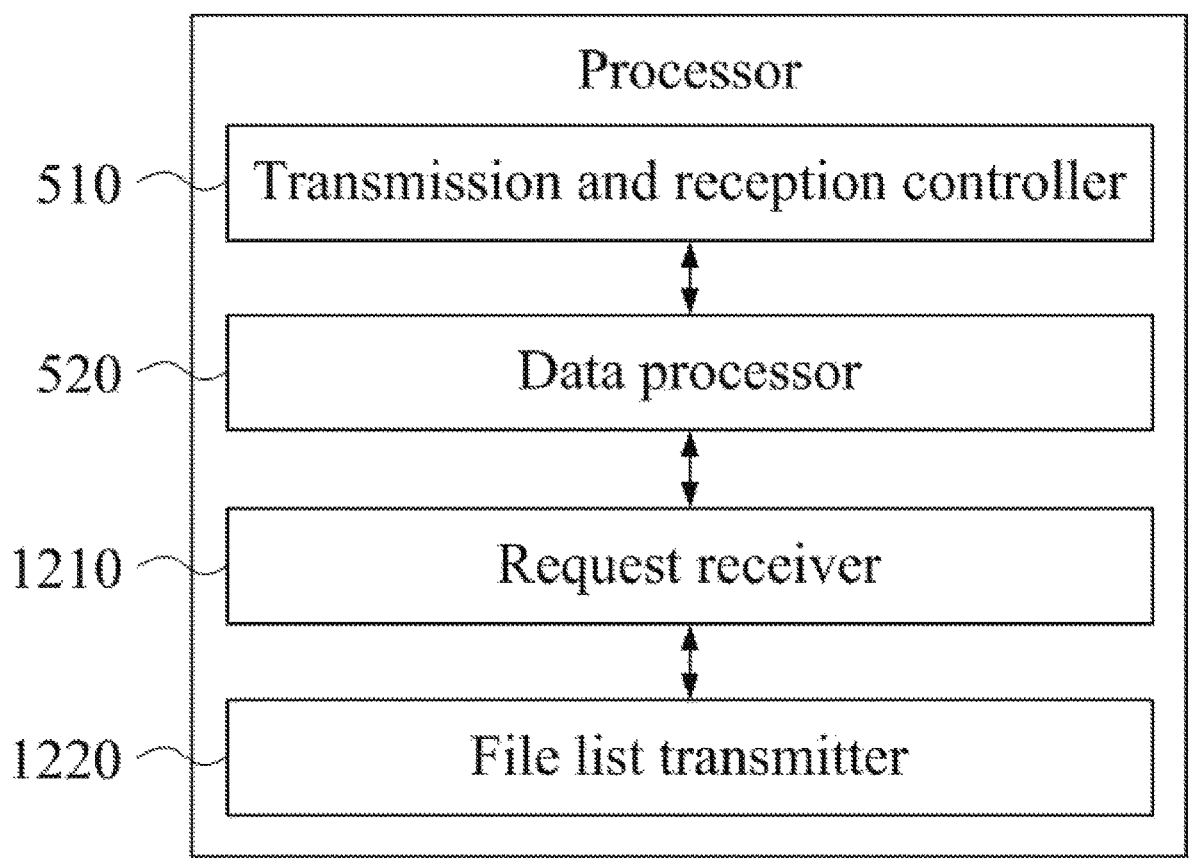
FIG. 12 is a block diagram illustrating another example of constituent elements included in at least one processor of a second electronic device according to at least one example embodiment.
Figure 13:
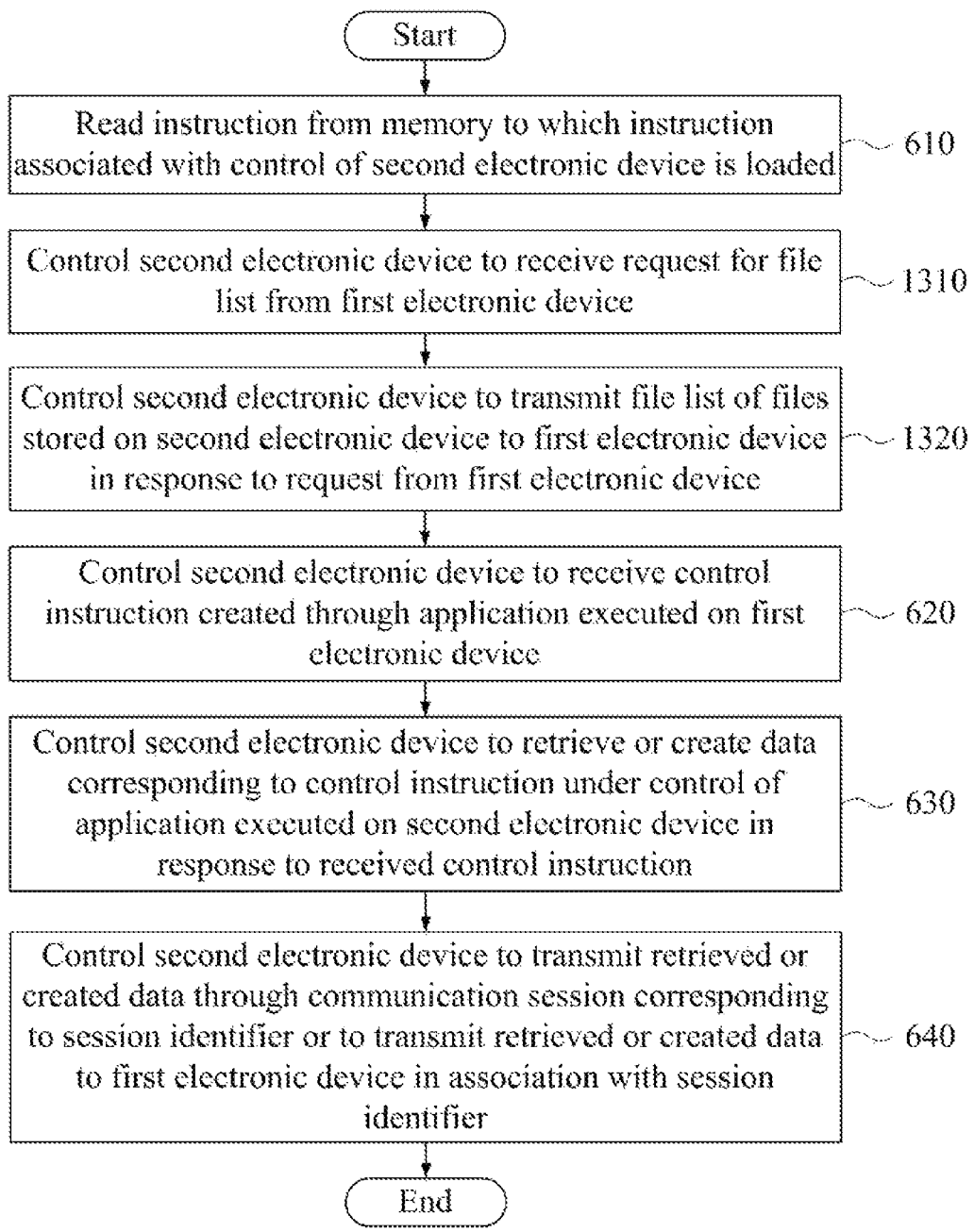
FIG. 13 is a flowchart illustrating another example of a method performed at a second electronic device according to at least one example embodiment.

FIG. 12 is a block diagram illustrating another example of constituent elements included in at least one processor of a second electronic device according to at least one example embodiment, and FIG. 13 is a flowchart illustrating another example of a method performed at a second electronic device according to at least one example embodiment. As described above, the second electronic device may be configured as the second electronic device 120. The processor 232 of the second electronic device 120 may further include a request receiver 1210 and a file list transmitter 1220 in addition to the transmission and reception controller 510 and the data processor 520 of FIG. 5. Here, the request receiver 1210 and the file list transmitter 1220 may be configured to be included in the transmission and reception controller 510, but is not limited thereto. As described above, the constituent elements of the processor 232 may be representations of different functions performed at the processor 232, which may indicate that the transmission and reception controller 510 may include functions of the request receiver 1210 and the file list transmitter 1220, or in other words, computer readable instructions may cause the processor 232 to execute the functions of the illustrated constituent elements of FIG. 13. The application interworking method of FIG. 13 may further include operations 1310 and 1320 in addition to operations 610 through 640 of FIG. 6, but are not limited thereto. Operations 1310 and 1320 may be performed prior to operation 620 or may be included in operation 620 and thereby performed. An example embodiment of performing operations 1310 and 1320 prior to operation 620 will be described with reference to FIG. 13.

In operation 1310, the request receiver 1210 may control the second electronic device 120 to receive a request for a file list (and/or I/O device list, application list, etc.) from the first electronic device 110. The request from the first electronic device 110 is a request to the second electronic device 120 for a list of files, I/O devices, applications, etc., stored on, included in, connected to, executable from, and/or associated with the second electronic device 120, and may be transferred to the second electronic device 120 through the server 150.

In operation 1320, the file list transmitter 1220 may control the second electronic device 120 to transmit the file list of files (and/or other lists) stored on the second electronic device 120 to the first electronic device 110 in response to the request from the first electronic device 110. Here, the file list (and/or other lists) may be transferred to the first electronic device 110 through the server 150, but the example embodiments are not limited thereto.

As described above with reference to FIGS. 10 and 11, a file identifier of a file selected from the file list (and/or other identifier associated with a user's selection using the selection interface) transmitted to the first electronic device 110 may be further included in the control instruction and thereby transmitted to the second electronic device 120. That is for example, in operation 620, the transmission and reception controller 510 of the second electronic device 120 may control the second electronic device 120 to receive the control instruction that includes the session identifier and the file identifier.

In the example embodiments of FIGS. 10 through 13, the action associated with the communication session may include, for example, an action of transmitting at least one file corresponding to the file identifier through the communication session corresponding to the session identifier. For example, in operation 630, the data processor 520 of the second electronic device 120 may verify at least one file corresponding to the file identifier. In operation 640, the transmission and reception controller 510 of the second electronic device 120 may control the second electronic device 120 to transmit the verified at least one file through the communication session corresponding to the session identifier.

Figure 14:
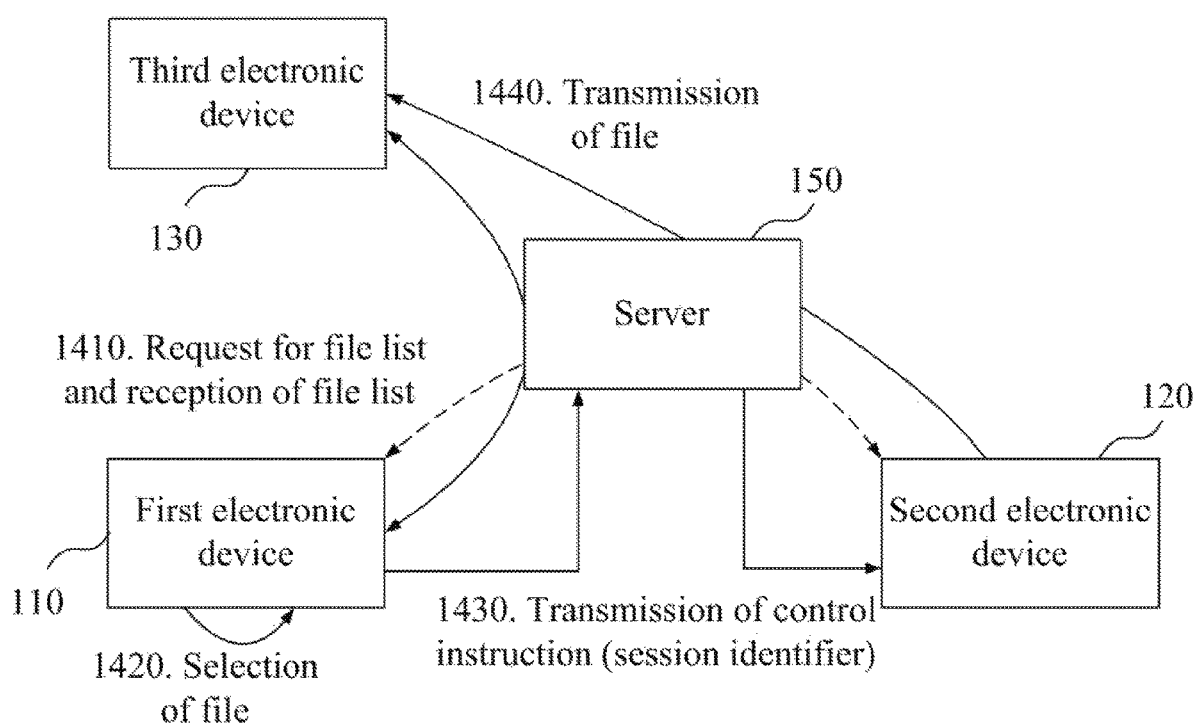
FIG. 14 illustrates an example of a file transmission process according to at least one example embodiment.

FIG. 14 illustrates an example of a file transmission process according to at least one example embodiment. Here, it is assumed that a conversation between a user of the first electronic device 110 and a user of the third electronic device 130 is ongoing, but the example embodiments are not limited thereto. As described above, although the conversation is not ongoing, the same process may be performed if the communication session is set, established, etc.

Referring to FIG. 14, in operation 1410, the first electronic device 110 may request the second electronic device 120 for a file list (and/or I/O device list, application list, etc.) of the second electronic device 120 through the server 150, and the server 150 may receive the requested list, such as the file list, from the second electronic device 120.

In operation 1420, the first electronic device 110 may select at least one item from the requested list, such as one or more files from the file list. For example, a selection of a file may be performed by the user of the first electronic device 110 and the first electronic device 110 may recognize the selected file in response to an input of the user.

In operation 1430, the first electronic device 110 may transmit, to the second electronic device 120, a control instruction that includes an identifier related to the selection, such as a file identifier of the selected file, and a session identifier. The control instruction may be transferred to the second electronic device 120 through the server 150, but is not limited thereto.

In operation 1440, the second electronic device 120 may transmit the file and/or result corresponding to the selection identifier, e.g., the file identifier, through a communication session corresponding to the session identifier. For example, the second electronic device 120 may transmit the file corresponding to the file identifier to the third electronic device 130 through the server 150.

According to some example embodiments, the second electronic device 120 may transmit the file corresponding to the file identifier to the first electronic device 110 in association with the session identifier. The file may be transmitted to the first electronic device 110 through the server 150 or directly through a near field communication network, such as Bluetooth, etc. In this case, the first electronic device 110 may transmit the received file to the third electronic device 130 through the communication session.

According to other example embodiments, at least three devices, for example, the electronic devices 110, 120, and 140, may be identified in association with an account of the user. In this case, the control instruction may be transmitted to both the second electronic device 120 and the fourth electronic device 140 (e.g., a plurality of other electronic devices associated with the account of the user). Here, if an action corresponding to the control instruction is executed on a single device, for example, the second electronic device 120, information indicating the execution of the action may be transmitted to a remaining device, for example, the fourth electronic device 140 through the server 150 and the execution of the action may be cancelled at the remaining device.

Figure 15:
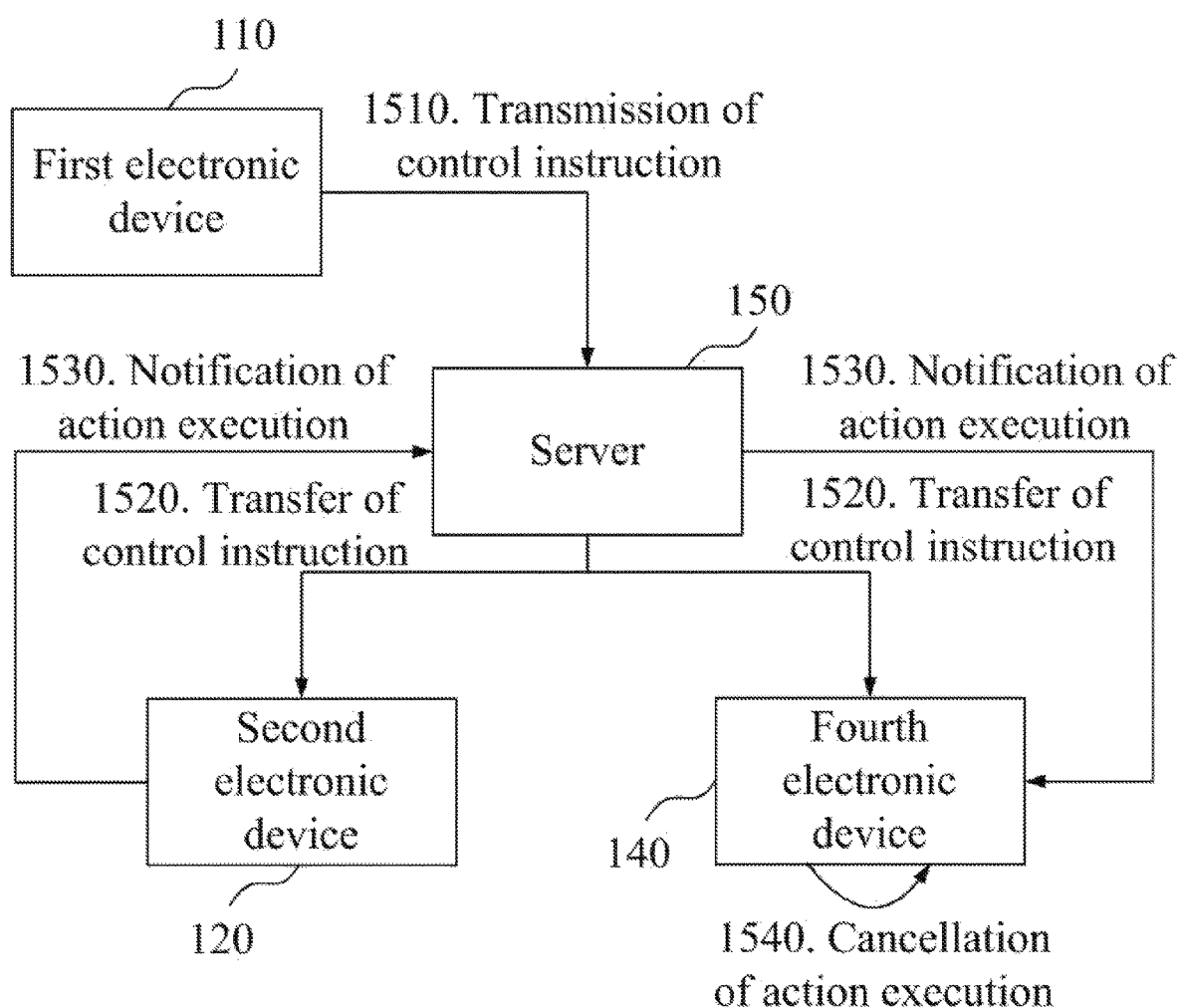
FIG. 15 illustrates an example of an action cancellation process according to at least one example embodiment.

FIG. 15 illustrates an example of an action cancellation process according to at least one example embodiment, but the example embodiments are not limited thereto.

Referring to FIG. 15, in operation 1510, a control instruction of the first electronic device 110 may be transmitted to the server 150.

In operation 1520, the control instruction transferred to the server 150 may be transmitted to both the electronic devices 120 and 140 identified in association with the account of the user.

In operation 1530, the second electronic device 120 may execute an action corresponding to the control instruction and may notify the server 150 that the action is executed. Accordingly, the server 150 may notify the fourth electronic device 140 corresponding to a remaining device that the action has been performed. Additionally, in other example embodiments, the second electronic device 120 may notify the fourth electronic device 140 that the action has been performed directly.

In operation 1540, the server 150 and/or the fourth electronic device 140 may cancel the execution of the action.

As described above, the server 150 may be a messenger server and may route data, for example, a conversation message, a file, etc., transmitted and received through the communication session. In addition, the server 150 may further process the control instruction, a list request (e.g., a file list request, etc.), a transfer of the requested list (e.g., transfer of a file list, etc.), and the like. For example, the server 150 may include information for identifying devices associated with an account of the user. Accordingly, once the control instruction or the list request is transferred from the user to the server 150, the server 150 may identify devices associated with the account of the user and may transfer the control instruction, the list request, etc., to the identified devices. Accordingly, without a separate connection process between electronic devices, for example, the electronic devices 110 and 120, of the user, the user may transmit the control instruction and interworking between applications installed on the electronic devices is enabled.

According to some example embodiments, in response to a presence of a plurality of electronic devices of a user identified in association with a single account of the user, it is possible to process an action associated with a single communication session through interworking between applications installed on the plurality of electronic devices, respectively.

The units described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as Bluray, DVD, and CD ROM disks; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable medium storing computer readable instructions, which when executed by at least one processor, cause the at least one processor to perform a method for application interworking between devices, wherein the application interworking method comprises:

establishing a communication session on a messaging service associated with a first account of a first user of a first electronic device using a first application executed on the first electronic device, the communication session including at least a second account of a second user of a third electronic device, the first account and the second account associated with the messaging service;

generating a user interface for creating a control instruction in a chatroom associated with the communication session, the chatroom including the first account and the second account, the user interface allowing the first account to control a second electronic device associated with the first account;

receiving a user input via the user interface from the first user using the first electronic device, the user input corresponding to an action to be performed by the second electronic device; and transmitting a control instruction that includes a session identifier of the communication session to the second electronic device associated with the first account corresponding to the user input, the control instruction causing the second electronic device to start execution of a second application on the second electronic device, the control instruction further including instructions for the second electronic device that cause the second electronic device to execute the action to be performed by the second electronic device, and transmit results of the executed action to the chatroom using the session identifier, and the action to be performed by the second electronic device including executing a camera included in the second electronic device, and transmitting an image created using the executed camera via the chatroom to the first electronic device and/or the third electronic device.

2. The non-transitory computer-readable medium of claim 1, wherein the first application is a messenger service application corresponding to the messaging service; and the first application executing on the first electronic device and the second application executing on the second electronic device are different versions of the messenger service application.

3. The non-transitory computer-readable medium of claim 1, wherein the action to be performed by the second electronic device includes:

generating a selection interface for selecting at least one file stored on the second electronic device;

transmitting the generated selection interface to the first electronic device; and transmitting the at least one selected file to the chatroom, the at least one selected file selected by the first user at the first electronic device.

4. The non-transitory computer-readable medium of claim 1, wherein the action to be performed by the second electronic device includes, transmitting the image created using the executed camera to the first electronic device in association with the session identifier; and transmitting the image received from the second electronic device in association with the session identifier via the chatroom to the third electronic device connected to the communication session.

5. The non-transitory computer-readable medium of claim 1, wherein the application interworking method further comprises:

receiving a file list of files stored on the second electronic device; and receiving a selection on at least one file from the received file list, and wherein the transmitting comprises transmitting a control instruction including at least one file identifier of the selected at least one file.

6. The non-transitory computer-readable medium of claim 5, wherein the action to be performed by the second electronic device includes transmitting the at least one file corresponding to the at least one file identifier via the chatroom to the first electronic device and/or the third electronic device.

7. The non-transitory computer-readable medium of claim 5, wherein the action to be performed by the second electronic device includes:

transmitting the at least one file corresponding to the at least one file identifier to the first electronic device through the session identifier; and transmitting the at least one file received from the second electronic device in association with the session identifier via the chatroom to the third electronic device connected to the communication session.

8. The non-transitory computer-readable medium of claim 1, wherein the action to be performed by the second electronic device is performed in response to registering a notification that the control instruction is received at the second electronic device, and receiving a response from the first user on the notification.

9. The non-transitory computer-readable medium of claim 1, wherein the control instruction is transmitted to the second electronic device through a server configured to route data transmitted for the communication session.

10. The non-transitory computer-readable medium of claim 1, wherein in response to a plurality of second electronic devices being associated with the first user, the control instruction is transmitted to each of the plurality of second electronic devices through a server configured to route data transmitted for the communication session; and in response to execution of the action to be performed by the second electronic device at one of the second electronic devices among the plurality of second electronic devices, information indicating the execution of the action is transmitted to the remaining second electronic devices of the plurality of second electronic devices through the server, and the execution of the action is cancelled at the remaining second electronic devices.

11. A non-transitory computer-readable medium storing computer readable instructions, which when executed by at least one processor, cause the at least one processor to perform a method for application interworking between devices, wherein the application interworking method comprises:

receiving, at a second electronic device, a control instruction created through a first application executed on a first electronic device, the control instruction including a session identifier of a communication session on a messaging service established using a first account of a first user and a user input corresponding to an action to be performed by the second electronic device, the first electronic device and the second electronic device associated with the first user, the communication session including at least a second account of a second user associated with a third electronic device, the first account and the second account associated with the messaging service; and in response to the received control instruction, starting execution of a second application on the second electronic device, and execute the action to be performed by the second electronic device, the executing the action to be performed including, retrieving or creating data corresponding to the control instruction under control of the second application executed on the second electronic device, transmitting the retrieved or created data via a chatroom associated with the communication session to the first electronic device and/or the third electronic device, and the action to be performed by the second electronic device including executing a camera included in the second electronic device, and transmitting an image created using the executed camera via the chatroom to the first electronic device and/or the third electronic device.

12. The non-transitory computer-readable medium of claim 11, wherein the retrieving or the creating comprises, generating a selection interface for selecting at least one file stored on the second electronic device, receiving a selection of at least one file through the selection interface from the first electronic device, verifying the at least one selected file; and the transmitting comprises transmitting the at least one verified file via the chatroom to the first electronic device and/or the third electronic device.

13. The non-transitory computer-readable medium of claim 11, wherein the transmitting comprises transmitting the created image to the first electronic device in association with the session identifier; and the image received at the first electronic device in association with the session identifier is transmitted to the third electronic device connected to the chatroom.

14. The non-transitory computer-readable medium of claim 11, wherein the application interworking method further comprises:

transmitting a file list of files stored on the second electronic device to the first electronic device in response to a request from the first electronic device; and receiving at least one file identifier of at least one file from the file list selected at the first electronic device.

15. The non-transitory computer-readable medium of claim 14, wherein the retrieving or the creating comprises verifying at least one file corresponding to the at least one file identifier; and the transmitting comprises transmitting the at least one verified file via the chatroom to the first electronic device and/or the third electronic device.

16. The non-transitory computer-readable medium of claim 14, wherein the retrieving or the creating comprises verifying at least one file corresponding to the at least one file identifier; and the transmitting comprises transmitting the at least one verified file to the first electronic device in association with the session identifier; and the at least one file received at the first electronic device in association with the session identifier is transmitted to the third electronic device via the chatroom.

17. A method for interworking between applications of devices, the method comprising:

receiving, at a second electronic device, a control instruction created through a user interface for a chatroom on a messaging service, the control instruction including a session identifier of a communication session of the chatroom established using a first account of a first user and a user input corresponding to an action to be performed by the second electronic device, the chatroom included with a first application executed on a first electronic device, the first electronic device and the second electronic device associated with the first user, the communication session of the chatroom including at least a second account of a second user associated with a third electronic device, the first account and the second account associated with the messaging service; and in response to the received control instruction, starting execution of a second application on the second electronic device, and executing the action to be performed by the second electronic device, the executing the action to be performed including, retrieving or creating data corresponding to the control instruction using the second application executed on the second electronic device, transmitting the retrieved or created data via the chatroom to the first electronic device and/or the third electronic device, and the action to be performed by the second electronic device including executing a camera included in the second electronic device, and transmitting and image created using the executed camera via the chatroom to the first electronic device and/or the third electronic device.

18. The method of claim 17, wherein the retrieving or the creating comprises, generating a selection interface for selecting at least one file stored on the second electronic device, receiving a selection of at least one file through the selection interface from the first electronic device, and verifying the at least one file selected through the selection interface; and the transmitting comprises transmitting the at least one verified file via the chatroom to the first electronic device and/or the third electronic device.

19. The method of claim 17, wherein the transmitting includes transmitting the created image via the chatroom to the first electronic device and/or the third electronic device using the session identifier.

* * * * *